United States Patent [19]

Stump

[11] 4,169,214
[45] Sep. 25, 1979

[54] DIGITAL CARRIER-CONCENTRATOR SYSTEM WITH TASI

[75] Inventor: Theodore M. Stump, Costa Mesa, Calif.

[73] Assignee: The Anaconda Company, New York, N.Y.

[21] Appl. No.: 885,757

[22] Filed: Mar. 13, 1978

[51] Int. Cl.² ............................................. H04J 6/02
[52] U.S. Cl. ............................ 179/15 AS; 179/15 AP
[58] Field of Search ........ 179/15 AS, 15 BA, 15 BV, 179/15 BW, 15.55 R, 15 AP

[56] References Cited

U.S. PATENT DOCUMENTS

| | | | |
|---|---|---|---|
| 3,864,524 | 2/1975 | Walker | 179/15 AS |
| 3,927,268 | 12/1975 | Sciulli et al. | 179/15 AS |

Primary Examiner—Kathleen H. Claffy
Assistant Examiner—Joseph A. Popek
Attorney, Agent, or Firm—William W. Haefliger

[57] ABSTRACT

In a digital carrier-concentration system, utilizing time slot assignment, comprises a delta modulator operable to convert analog signals into a digital binary bit stream, the modulator being responsive to the bit stream to decode a coincident pulse whenever a predetermined number of "ones" or "zeros" occur in the bit stream, a voice detect circuit responsive to the coincident pulse to provide a voice detect output, and a control assigns the stream a time slot in a high bit rate data channel in response to detection of the voice detect output, after a predetermined interval.

9 Claims, 7 Drawing Figures

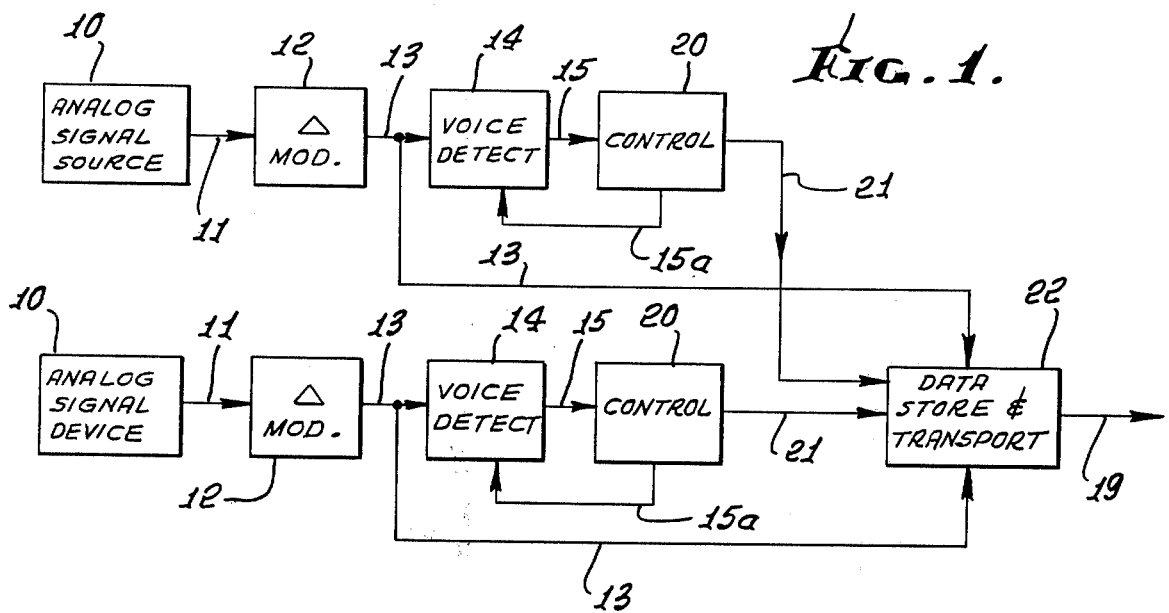
FIG. 1.
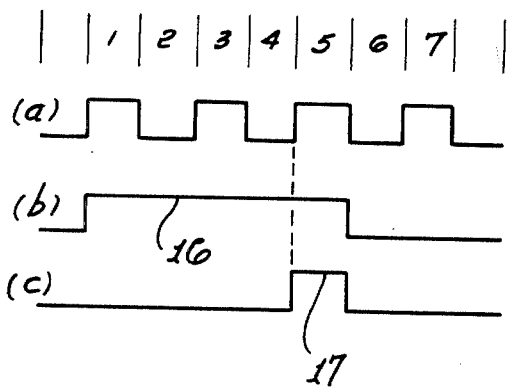
FIG. 4.
FIG. 6.

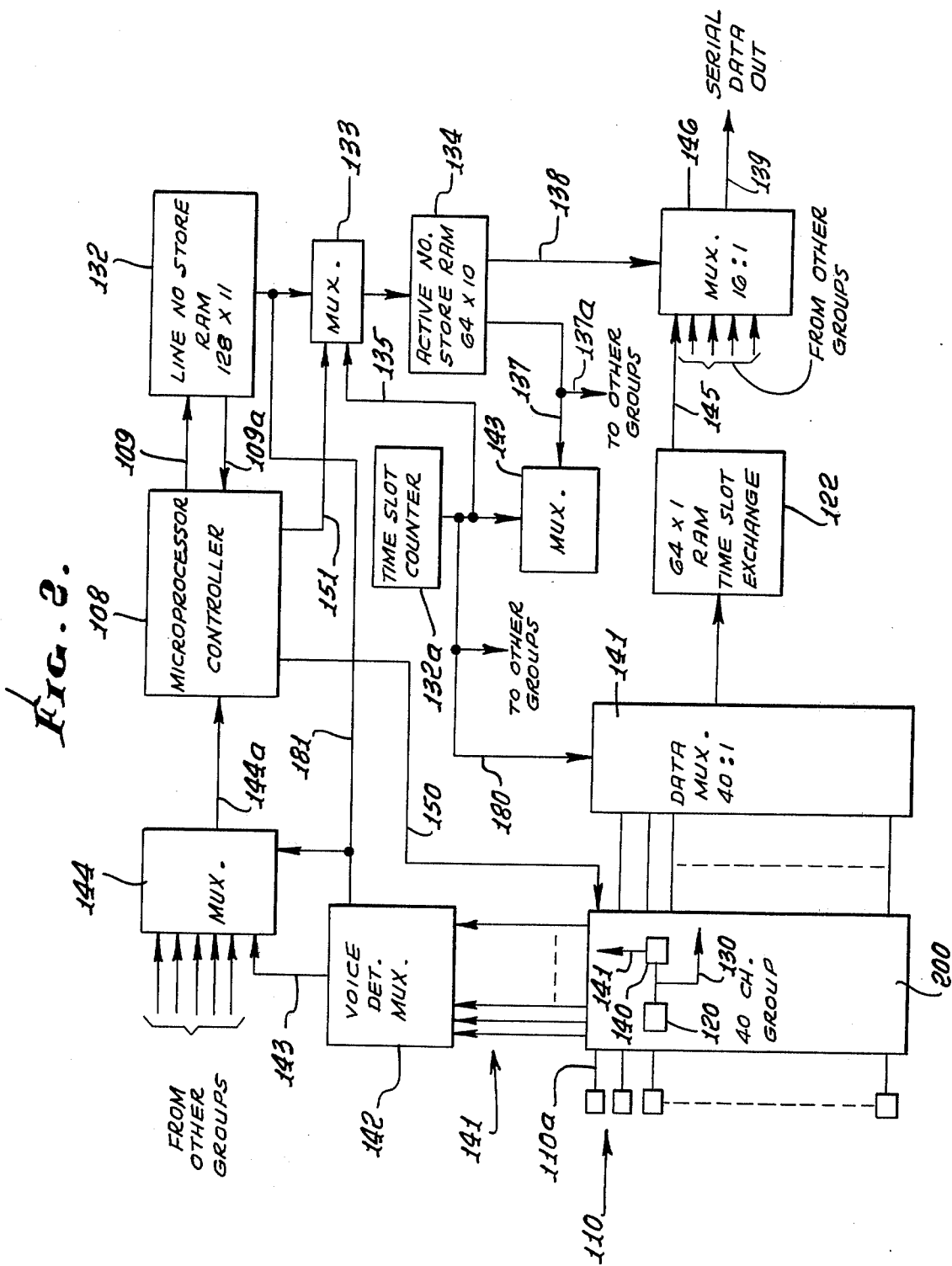

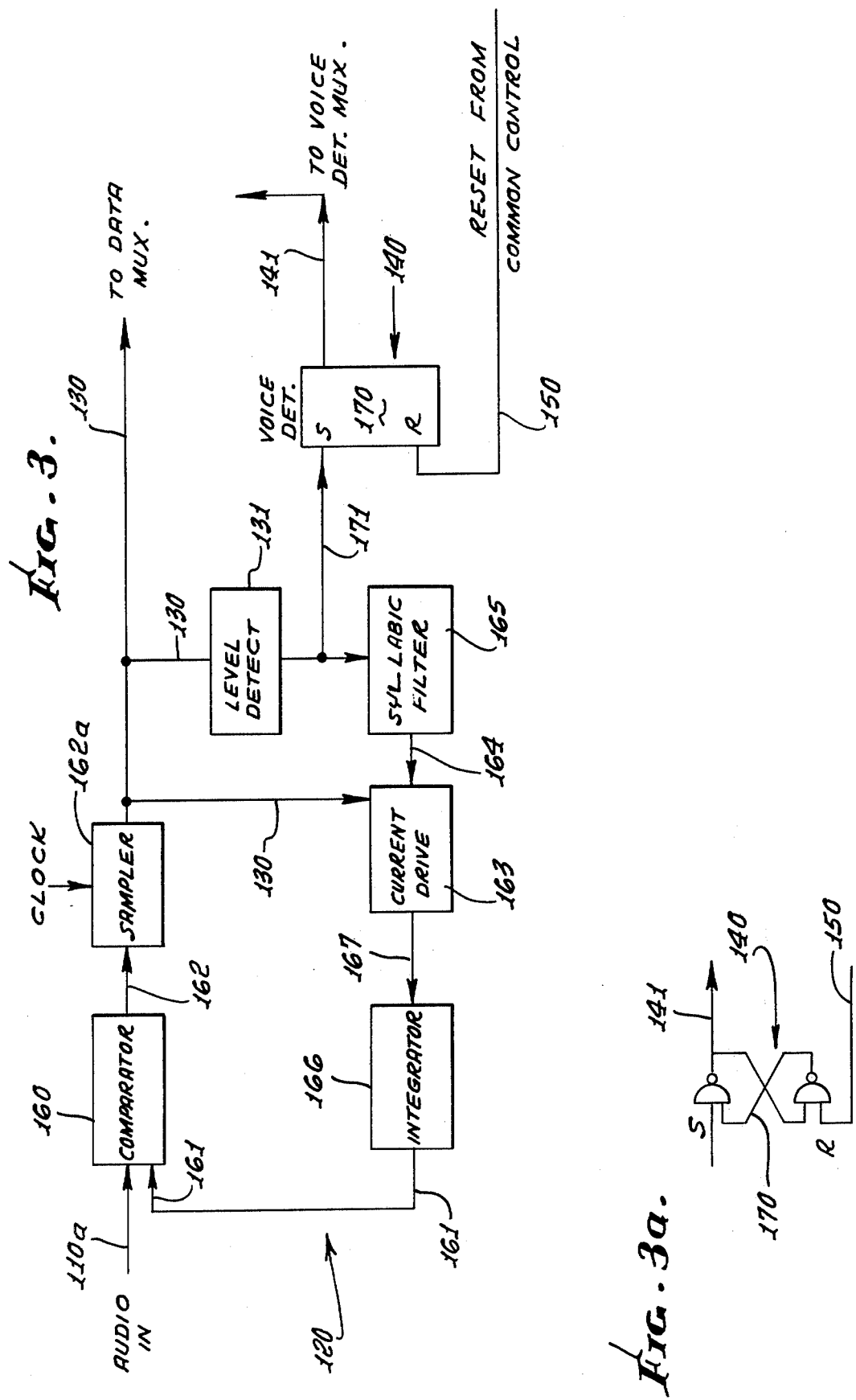

DIGITAL CARRIER-CONCENTRATOR SYSTEM WITH TASI

BACKGROUND OF THE INVENTION

This invention relates generally to concentration of data transmission, particularly in telephone subscriber systems.

In known telephone subscriber systems, the average use of each subscriber line is relatively low. Because of this fact, it has been recognized that subscribers may be serviced on a multiplexed basis, wherein the number of subscribers exceeds the number of available time slots of data transmission, the time slots being allocated on a demand basis. Since each direction of a subscriber conversation is normally used less than 50 percent of the time, a further concentration of subscribers could be handled if the available time slots are assigned only when needed for signaling or for carrying speech. This is the TASI principle used successfully for transoceanic calls. (Time Assignment Speech Interpolation).

While such assignment is helpful, there is continual need for further concentration of data transmission, without undesirable degradation of quality of the received data or information, in digital or analog (audio) form.

SUMMARY OF THE INVENTION

It is a major object of the invention to provide a digital carrier-concentration system utilizing time slot assignment, and employing delta modulation to particular advantage, in that enhanced concentration becomes possible. Basically, the system comprises:
 (a) a delta modulator operable to convert analog signals into a digital binary bit stream
 (b) the modulator being responsive to that stream to decode a coincident pulse whenever a predetermined number of "ones" or "zeros" occur in the bit stream,
 (c) a voice detector circuit responsive to the coincident pulse to provide a voice detect output; and
 (d) control means to assign the stream a time slot in a high bit rate data channel in response to detection of the voice detect output after a predetermined interval.

As will appear, the control means typically has reset connection to the voice detect circuit to reset same in response to detection of the voice detect output, thereby to provide a time delay interval prior to time slot assignment, whereby impulse noise clicks do not cause time slot assignment.

The system also typically includes a line number store with an associated multiplicity of line circuits on which respective active binary bit streams may appear, the control means scanning the circuits in said store to determine whether an active time slot is required for any scanned circuit; the control means may include an active line number store into which are written active line numbers to which time slots have been assigned; the control means may include a time slot counter operatively connected to address the active line number store in order to effect decoding of a selected active line number when its corresponding time slot occurs; data storage memory means may be provided to be operatively connected to the time slot counter to receive loading of data from multiple channels during a first portion of a time slot; the active line number store may be operatively connected with the data storage memory means from which selected data is read out during a second portion of the time slot, the selected data corresponding to said selected active line number; and the control means may include a multiplexer connected between said line number store and said active line number store to scan said line circuits associated with the line number store, said multiplexer including said delta modulator which determines voice detect, active status.

These and other objects and advantages of the invention, as well as the details of an illustrative embodiment, will be more fully understood, from the following description and drawings, in which:

DRAWING DESCRIPTION

FIG. 1 is a generalized block diagram;

FIG. 2 is a block diagram of a system incorporating the invention;

FIG. 3 is a block diagram of a continuously variable slope delta modulator, with voice detect;

FIG. 3a is a circuit diagram of the inverter shown in FIG. 3;

FIG. 4 is a wave diagram;

FIG. 6 is a flowgraph of time slot assignment steps, using delta modulation with TASI.

DETAILED DESCRIPTION

Figure 5:
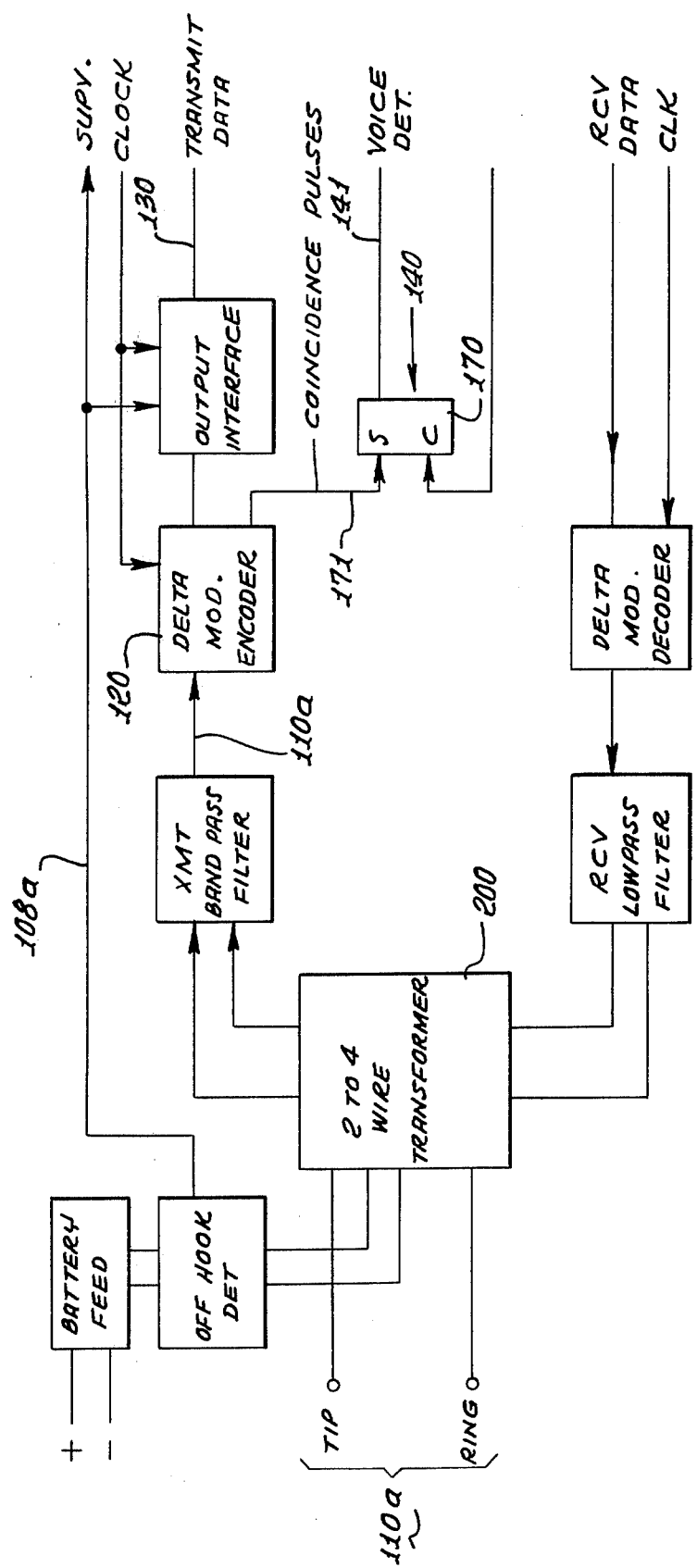
FIG. 5 is a block diagram.

Referring first to the generalized diagram of FIG. 1, the output from a source 10 of analog signals is passed at 11 to a delta modulator 12. The latter is operable to convert analog signals, as for example voice signals in a telephone system, into a digital binary bit stream. The modulator 12 includes detector means responsive to the input stream to decode or generate a coincident pulse or signal appearing at 13 whenever a predetermined number of "ones" or "zeros" occur in the input bit stream. A voice detector 14 receives the coincident pulse or signal and processes it to determine if a voice interval has started or terminated.

FIG. 4 shows, in waveform (a), a series of alternate "ones" and "zeros" produced by the delta modulator where no change in the input analog signal occurs. If, on the other hand, the input analog signal is constantly rising over the time periods of five pulses, the waveform produced by the delta modulator appears as at 16 in (b) of FIG. 3.

The detect circuit of the modulator may generate a coincident pulse when four one's or four zero's occur, such as coincident pulse appearing at 17 in waveform (c) of FIG. 3. The circuit may otherwise generate the coincident pulse when 3, or 5, or other numbers of one's or zero's occur, if desired; however, four is the optimum.

Referring again to FIG. 1, voice detector 14 typically comprises a latching inverter that is set by a coincidence pulse on input 13, and re-set at 15a by control means 20. The latter also assigns the bit stream at 13 a transmission time slot in a high bit rate channel 19 in response to the state of the voice detect latch 14, as will be further explained in the following description. The output of control 20 is passed at 21 to a data store and transmit circuit 22. The latter receives and stores data from multiple channels 13, as shown. Control 20 triggers the memory 22 to read out stored voice data associated with channels 13 whenever transmission time slots for the respective channels are available, in the manner similar to that of the known TASI (Time Assignment Speed Interpolation) principle. See U.S. Pat. No. 3,927,268 for reference to the TASI system.

More specifically, the type delta modulator 12 used adapts to input speech levels by changing step size based on the content of the digital bit stream. In particular, whenever 4 successive "ones" or 4 successive "zeros" occur, a "coincident" pulse is decoded. Because of the impulsive nature of speech signals, there will be a much higher density of coincidence outputs for speech than for background noise. The density of coincidence pulses is accordingly, used in this system as a criteria for assigning time slots.

Referring now to the more complete system of FIGS. 2, 3 and 3a, analog signal sources 110 may comprise telephone units or sets, with analog outputs at 110a. The latter are fed via suitable transformers and in parallel to delta modulators 120 associated with block 200, designating as for example a 40 channel group. Voice detect circuits 140 are connected with the delta modulator outputs 130, as via level detect circuits 131, to function as described above at 14. The delta modulators correspond to those described above at 12. The voice detect outputs at 141 are fed to a multiplexer 142, the series output of which at 143 is fed via multiplexer 144 to controller 108.

Controller 108 systematically scans the line circuits via inputs 144a from 144, to determine those that require supervision, for example those that are off-hook or being rung. See in this regard connection 108a in FIG. 5. These line numbers are written at 109 into line number store 132, which typically comprises a random access memory, i.e. RAM. Thus, RAM 132 may be considered as provided with an associated multiplicity of line circuits in which respective associated binary bit streams may appear. Thus, store 132 contains non-active numbers (say, off-hook but no speech occurring), as well as active numbers (off-hook and speech occurring).

The numbers written into store 132 are constantly scanned in sequence to determine whether an active time slot (for voice transmission) is needed, and time slots are assigned as required, by controller 108.

A counter 132a, typically a time slot counter, drives a multiplexer circuit 133, as shown, that scans the line circuits in store 132 for determining their status, each position being checked for one cycle of the store RAM to see if a change in status is required.

Whenever all the time slots are used up, the common control 108 looks for a line which does not require a time slot, i.e. releases a slot, and assigns that slot to the next line that requires a slot, i.e. a line that becomes active (through voice transmission). There is no attempt to find more than one free time slot at a time, so that if the number of calls is less than the number of time slots available, no reassignments will take place. Numbers are erased from the line number store if the supervision indication goes away; and when erasing occurs, the associated time slots are made immediately available for new assignment. Note return connection 109a between 108 and 132.

The control means illustrated also includes an active line number store, or RAM 134, into which are typically written (via convert 109, 151 and 133) active line numbers to which time slots have been assigned. This RAM 134 is addressed at 135 by the counter 132a via multiplexer 133, so that when the assigned time slot occurs, the appropriate or corresponding active line number is decoded, to appear at outputs 137 and 138. That output effects transmission of the corresponding voice bit data to the telephone line 139, in the manner described below.

FIG. 2 also shows data storage memory means, such as 65×1 RAM 122. The counter 132a drives (at 180) a multiplexer 141 which operates to load the data output at 130 of multiple channels (as for example 40 channels) in sequence into the RAM 122. Typically, the RAM is written into during the first half of the time slot.

The active line number store 134 is also connected, via output 137 and multiplexer 143, with RAM 122, whereby during the second half of a particular slot the associated active line number causes readout, from RAM 122 of voice data for the line circuit assigned to that time slot, such readout appearing at RAM output 145. Note output 137a of the active line number store 134, which is connected to multiplexers 143 and RAMs 122 of other channel groups, whereby RAM 134 also selects which channel group the data is to be taken from. Each group may be considered to include a set of elements 141, 143, 122 and 145. Multiplexer 146 to which RAM 134 is connected at 138, multiplexes the outputs at 145 onto the output line 139 in serial relation.

Note the connection at 150 of the controller 108 to the reset terminals of the voice detect circuits; also, the controller is connected at 151 with multiplexer 133. Line 181 designates selection of a line circuit as a result of scanning by RAM 132.

Referring to FIG. 3, a typical delta modulator includes a comparator 160 having inputs 110a and 161; a sampler 162a receiving input from the comparator output at 162; a current drive 163 having input at 130 from the sampler output and input at 164 from syllabic filter 165; and integrator 166 producing output at 161 in response to input at 167.

The use of delta modulation coincidence pulses as a voice indication leads to a very simple implementation of the voice detector. Essentially, a latching inverter 170 is set by the coincidence pulse on output lead 171 from the level detector 131, and reset by common control (see lead 150). The common control normally scans the voice detector outputs as at 141 to find one that has gone active and needs a time slot. As soon as one that has gone active is detected, the common control sends a reset on the common voice detect reset lead 150. A time out period is passed to assure that voice is present. The time out period is on the order of 2 milliseconds, and prevents impulse noise clicks from causing time slot allottment. When continually scanning to look for a free time slot (as when all time slots are used up) the common control resets all of the voice gates and waits for a second time out period. This may be as much as 40 milliseconds (to prevent capture of an "already talking" line). It then scans the active lines to find a no-voice indication. See also FIG. 3a.

It will be noted in this regard that a high speed common control is used to provide the time-outs. Thus when looking for an idle channel, all of the voice detect latches are reset at once. After the time-out period (for example 40 msec) all the channels which have not again set their voice detect latches are assumed idle and may have their time slots re-assigned. This provides for a very simple all digital implementation to a voice detector. Assignment involves use of a microprocessor in the common control with read/write memory, to compare the contents of the RAM 132 with the contents of the supervisory bus.

In the receiver RAM corresponding to RAM 122, the information written in during the first part of each time slot comes from two sources. For lines with active time slots the source is the data stream from the transmitter. For the inactive channels which do not have time slots the input is from an alternating zero one pattern. This provides the inactive channels with the proper quiet bit pattern.

The delta-mod digital transmission system is inherently 4 wire, as seen in FIG. 5. At the terminals, 4 wire to 2 wire hybrids as at 200 are used to convert to 2 wire (tip and ring) transmission. Transhybrid leakage in these transformers 200 may cause coincidence pulses in the far end encoder when the near end party is speaking. This will generate a time slot request and defeat the purpose of the time assignment system. A cure may be effected by not allotting a time slot if the other direction transmission has already seized one, to provide an operation similar to echo suppression. The return loss properties of a channel operating in this way are extremely good. The inactive channels may be scanned and examined for the presence of a 2000 to 2250Hz echo suppression tone to remove this feature, to permit modems to operate both ways.

In FIG. 5, note the receive delta modulation decoder 201; the receive low pass filter 202 between decoder 201 and hybrid 200; and the transmit band pass filter 203 between the hybrid and the encoder 120.

Blocks referred to in the above description are commercially available, as follows:

| Item | Model and Manufacturer |
| --- | --- |
| 200 | Anaconda Ditital Subscriber Carrier Channel CCTS (DBCS-40) |
| 142 | Parallel to serial CMOS registers MCl 4014 |
| 144 | 74LS151 8 input multiplexers |
| 108 | ZlLOG Z-80 with supporting logic circuits |
| 132a | 74LS 161 presetable counter |
| 132 | TMS 4036 64×8 bit rams (Texas Inst.) |
| 133 | 74LS151 8 input multiplexers |
| 134 | TMS 4036 |
| 143 | 74LS151 8 input multiplexers |
| 141 | parallel to serial CMOS registers MCl 4014 |
| 122 | AM 1101A 256 bit RAM |
| 146 | 74LS151 |
| 160 | part of MC3418 CODEC (delta mod) |
| 161 | part of MC3418 CODEC (delta mod) |
| 131 | part of MC 3418 CODEC (delta mod) |
| 165 | RC filter |
| 163 | part of MC3418 CODEC |
| 166 | part of MC3418 CODEC |
| 170 | MC14011 NAND GATE (CMOS) |

FIG. 6 is a self explanatory flow graph of time slot assignment steps and functions in the described system integrating delta modulation and TASI.

I claim:

1. In a digital carrier-concentration system utilizing time slot assignment, the combination comprising
   (a) a delta modulator operable to convert analog signals into a digital binary bit stream,
   (b) said modulator being responsive to said stream to decode a coincident pulse whenever a predetermined number of "ones" or "zeros" occur in the bit stream,
   (c) a voice detect circuit responsive to said coincident pulse to provide a voice detect output, and
   (d) control means to assign said stream a time slot in a high bit rate data channel in response to detection of said voice detect output, after a predetermined interval.

2. The combination of claim 1 including a line number store with an associated multiplicity of line circuits on which respective active binary bit streams may appear, the control means scanning the circuits in said store to determine whether an active time slot is required for any scanned circuit.

3. The combination of claim 2 wherein the line number store comprises a random access memory into which line numbers needing supervision are written.

4. The combination of claim 2 wherein the control means includes an active line number store into which are written active line numbers to which time slots have been assigned.

5. The combination of claim 4 wherein the control means includes a time slot counter operatively connected to address the active line number store in order to effect decoding of a selected active line number when its corresponding time slot occurs.

6. The combination of claim 5 including data storage memory means operatively connected to the time slot counter to receive loading of data from multiple channels during a first portion of a time slot.

7. The combination of claim 6 wherein the active line number store is operatively connected with the data storage memory means from which selected data is read out during a second portion of the time slot, the selected data corresponding to said selected active line number.

8. The combination of claim 4 wherein said control means includes a multiplexer connected between said line number store and said active line number store to scan said line circuits associated with the line number store, said multiplexer including said delta modulator which determines voice detect, active status.

9. The combination of claim 1 wherein said control means has a reset connection to the voice detect circuit to reset same in response to detection of said voice detect output, thereby to provide a delay interval prior to said time slot assignment.

* * * * *